(12) United States Patent
Tanaka et al.

(10) Patent No.: US 7,078,080 B2
(45) Date of Patent: Jul. 18, 2006

(54) SYNTHETIC RESIN CONTAINER HAVING A CRAZE PATTERN THEREON AND METHOD FOR PRODUCING THE SAME

(75) Inventors: Noriyuki Tanaka, Koto-ku (JP); Takao Iizuka, Koto-ku (JP)

(73) Assignee: Yoshino Kogyosho Co., Ltd., Tokyo (JP)

( * ) Notice: Subject to any disclaimer, the term of this patent is extended or adjusted under 35 U.S.C. 154(b) by 0 days.

(21) Appl. No.: 10/629,593

(22) Filed: Jul. 30, 2003

(65) Prior Publication Data

US 2004/0144746 A1    Jul. 29, 2004

(30) Foreign Application Priority Data

Jul. 30, 2002   (JP)   .............................. 2002-220615

(51) Int. Cl.
  *B29D 22/00*   (2006.01)
  *B29D 23/00*   (2006.01)
  *B32B 1/08*    (2006.01)

(52) U.S. Cl. ..................... 428/35.7; 428/155; 428/147; 428/152

(58) Field of Classification Search ............... 428/35.7, 428/483, 516, 34.1, 35.2, 147, 152, 155, 428/500
See application file for complete search history.

(56) References Cited

U.S. PATENT DOCUMENTS

| | | | | |
|---|---|---|---|---|
| 2,612,456 A | * | 9/1952 | Thacker et al. | 427/257 |
| 3,560,240 A | * | 2/1971 | Simmons | 431/291 |
| 4,451,329 A | * | 5/1984 | Batchelor et al. | 216/31 |
| 5,425,926 A | * | 6/1995 | Kunikiyo et al. | 427/393.5 |

OTHER PUBLICATIONS

RD 412058 A, Aug. 1998.*

* cited by examiner

*Primary Examiner*—Michael C. Miggins
(74) *Attorney, Agent, or Firm*—Oliff & Berridge, PLC

(57) ABSTRACT

A synthetic resin container according to the invention has a craze pattern on the outer surface of its body. The container comprises an inner layer that comes into direct contact with content during its storage, an outer layer laid over the inner layer, and a translucent protective layer laid over the outer layer. The outer layer carries a craze pattern that has been obtained by applying a solvent to a preform or parison of the container after blow molding thereof. The protective layer covers and protects that portion of the outer layer, which carries the craze pattern, and preserves its visibility from outside.

2 Claims, 2 Drawing Sheets

FIG. 1a
FIG. 1b
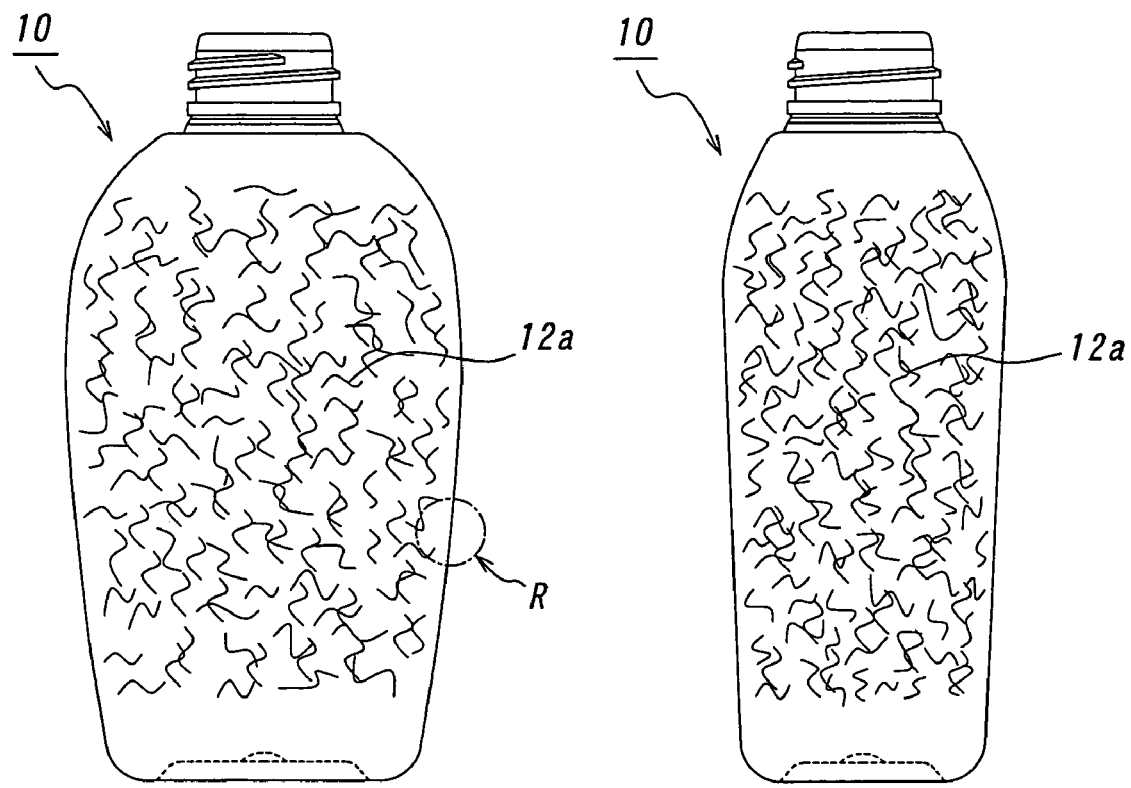
FIG. 1c
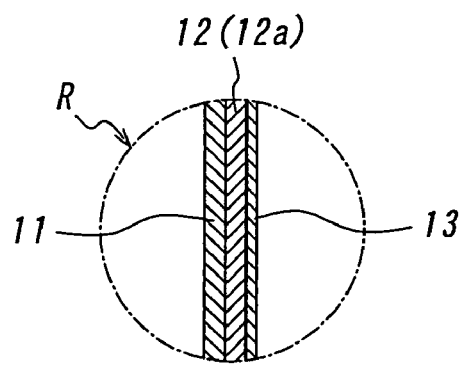

FIG. 2
FIG. 3
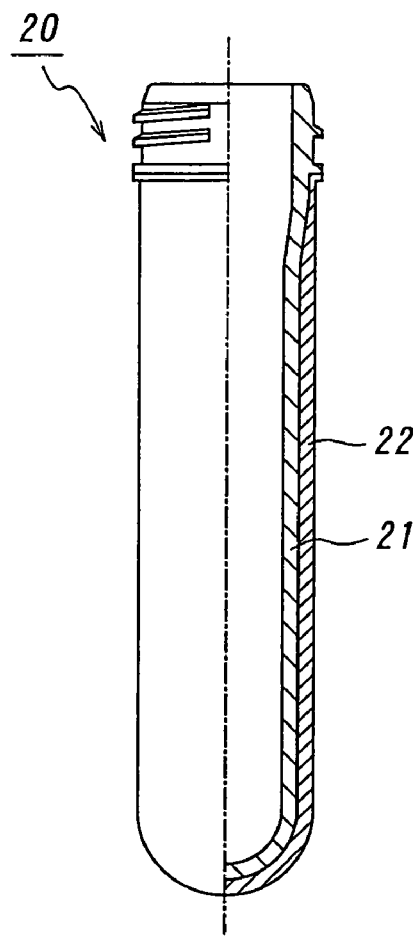
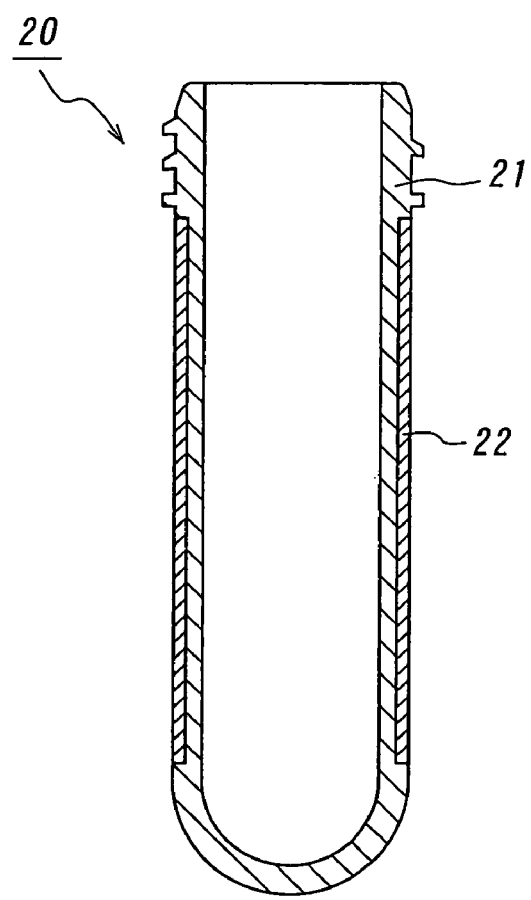

SYNTHETIC RESIN CONTAINER HAVING A CRAZE PATTERN THEREON AND METHOD FOR PRODUCING THE SAME

BACKGROUND OF THE INVENTION

The present invention relates to a synthetic resin container having a unique appearance and a method for producing the same.

Usually, a synthetic resin container is decorated by applying a label or printing a pattern on its surface. In recent years, trials have been made to produce a craze pattern on a synthetic resin container as in a glass container, to give a high-grade appearance to the container. However, up to the present, there has not been known any technology that allows one to readily and securely produce such a synthetic resin container having a decorative craze pattern thereon.

SUMMARY OF THE INVENTION

It is an object of the present invention to provide a synthetic resin container having a craze pattern on its outer surface, and to propose a method for producing such a container.

To this end, the present invention provides a synthetic resin container having a craze pattern on an outer surface of a container body, which comprises, in terms of its wall profile, an inner layer that comes into direct contact with content during storage thereof, an outer layer laid over the inner layer and having a craze pattern that has been formed by applying a solvent on a blow molded container body, and a translucent protective film covering, from outside, at least part of the outer layer that carries the craze pattern.

In the synthetic resin container according to the present invention, it is preferred that the outer layer is comprised of a cyclic polyolefin resin, and the inner layer is comprised of an olefin-based resin, such as polyethylene resin, polypropylene resin or the like, or of a polyester resin, such as polyethylene telephthalate or the like.

Further, in the synthetic resin container according to the present invention, it is preferred that the inner layer is colored, while the outer layer and protective film are made of a transparent or semi-transparent material.

The present invention further provides a method for producing a synthetic resin container having a craze pattern on an outer surface of a container body, which comprises the steps of preparing a preform or parison having a wall that comprises at least two layers wherein an inner layer and an outer layer are laid over one another by an extrusion molding or injection molding, subjecting the preform or parison to a blow molding, applying a solvent on the surface of a molded body obtained by the blow molding, thereby causing cracks to develop there as a craze pattern, and forming a translucent protective film on the outer surface of the molded body so that the film covers the craze pattern.

In preparing the preform or parison according to the above-mentioned method, it is preferred that the outer layer is made from a cyclic polyolefin resin, and the inner layer is made from a polyolefin-based resin such as polyethylene resin, polypropylene resin or the like, or from a polyester resin such as polyethylene telephthalate or the like.

The solvent to be applied on the outer layer to cause cracks to develop there in a craze pattern preferably comprises n-heptane.

BRIEF DESCRIPTION OF THE DRAWINGS

The present invention will be described in detail hereinafter, with reference to preferred embodiments illustrated in the accompanying drawings.

FIGS. 1a and 1b are, respectively, front view and side view of a synthetic resin container according to the present invention, while FIG. 1c is an enlarged sectional view of its wall region R.

FIG. 2 is a sectional view showing one example of a preform suitable for producing a container according to the present invention.

FIG. 3 is a sectional view showing another example of a preform also suitable for producing a container according to the present invention.

DESCRIPTION OF THE PREFERRED EMBODIMENTS

In FIGS. 1a, 1b and 1c, reference numeral 10 represents a synthetic resin container according to the present invention. Generally, the synthetic resin container 10 exhibits a bottle shaped and has a craze pattern 12a on the outer surface of the container body as a result of minute cracks developed there. As shown in FIG. 1c, the wall of the container body has a layered structure comprising at least three layers obtained by sequentially overlapping the following layers in the stated order: an inner layer 11, an outer layer 12 carrying the craze pattern 12a, and a translucent protective layer 13 covering that part of the outer layer 12, which carries the craze pattern 12a.

In order to prepare a synthetic resin container having a structure as described above, first of all, a preform 20 is prepared by an injection molding or extrusion molding to have a wall comprising two layers as shown in FIG. 2, with an inner layer 21 corresponding with the inner layer 11 of the container 10 being made from a polyolefin-based resin, such as polyethylene resin, polypropylene resin or the like, or a polyester resin, such as polyethylene telephthalate or the like, and with an outer layer 22 corresponding with the outer layer 12 of the container 10 being made from a cyclic polyolefin resin.

Upon preparation of the preform 20, it is possible to carry out co-injection molding or co-extrusion molding so as to form the inner and outer layers 21, 22 simultaneously. Alternatively, the inner and outer layers 21, 22 may be formed, respectively, by injection molding or extrusion molding as separate bodies, and these bodies may be integrated with each other by a subsequent step. Still alternatively, a preform of one of the inner and outer layers 21, 22 may be formed by injection molding or extrusion molding, and so-obtained preform may be used as an insert upon injection of the material for the other of the inner and outer layers 21, 22 so as to complete the preform 20.

The preform 20 is then subjected to a bi-axial stretch blow molding, to obtain a molded body having a desired shape. A solvent is applied on the outer surface (outer layer 12) of the molded body to cause cracks to develop as a craze pattern 12a. Subsequently, over the entire outer surface of the molded body, a shrink label is bonded or a coating material is applied (by spraying or coating) to form a protective film there, which prevents separation of the outer layer. The protective film 13 is made transparent or semitransparent so as to preserve the visibility of the crazing pattern 12a from outside.

Variations of the above-mentioned method which are otherwise similar except that the preform 20 is substituted for a parison, and the biaxial stretch blow molding for direct blow molding are also included in the present invention, though they are not illustrated here. The container according to the present invention may take, in addition to a bottle shape illustrated in the figure, a tubular shape which is formed by subjecting the compound material to co-extrusion molding without resorting to blow molding to thereby produce a tubular body. The tubular body may be integrated in molding with a head, or combined with a head separately prepared, and then have its bottom sealed.

The cyclic polyolefin resin preferably comprises, for example, addition polymers of cyclic olefin and áolefin, or hydrates of ring-opened polymers of cyclic olefin. The addition polymer of cyclic olefin and áolefin which contains cyclic olefin at a concentration of 5–60 mol % may comprise, for example, "Apl"® (Mitsui Chemicals Co.) and "Zeoner"® (Zeon Corp.). Although the polyolefin-based addition polymer containing a cyclic olefin component is a copolymer that comprises, as its essential components, a cyclic olefin component and an ethylene-based component in addition to those components, the polymer in question may further comprise an unsaturated monomer component which can co-polymerize with said polyolefins. Such copolymerizable unsaturated monomers may comprise cyclic diene compounds, such as dicyclopentadiene.

A preferred coating material suitable for the coating may comprise two-liquid type urethane-based coating materials, though the coating material suitable for the present invention is not limited thereto. Namely, there may be adopted coating materials generally used for coating applications, and there is no specific limitation in terms of the coating method.

The cyclic polyolefin resin acts very effectively as a barrier against invasion of moisture, and is suitably applied as a coating material to protect, when used as a coating of a container, its content. However, it is susceptible to strains and to invasion of vegetable or mineral oils or greases. Thus, when a container is coated with a cyclic polyolefin resin based coating material, and particularly when its wall carries residual strains, handling the container with fingertips tends to leave grease on its surface that may lead to development of cracks on its surface. The present invention is a deliberate exploitation of this phenomenon, and aims at decorating a container by deliberately generating minor cracks on its surface. Deliberate generation of minor cracks on the surface of a container can be achieved by applying n-heptane on the surface of a molded body produced by blow molding.

In the synthetic resin container 10 according to the present invention, the inner layer 11, outer layer 12 and protective film 13 constituting its wall may be made transparent or semi-transparent, though they may be given any desired color as appropriate. Particularly, in case the inner layer 11 is colored while the outer layer 12 and protective film 13 are made transparent or semi-transparent, the container exhibits a deep tone color when observed from outside. The preform or parison 20 used in the present invention may be prepared so that the outer layer 22 covers and surrounds the inner layer 21 only at the container body portion, as shown in FIG. 3. The relation of the outer layer to the inner layer is not limited to any specific arrangement.

It will be appreciated from the foregoing description that, according to the present invention, it is possible to efficiently produce a synthetic resin container having a desired craze pattern on its surface by only carrying out simple process steps. Moreover, according to the present invention, the container has a protective film such as a shrink label or coating applied over the craze pattern in the outer layer. Thus, even if the container is contaminated on its surface with vegetable or mineral oil or greases, development of further cracks is positively prevented, without influencing over the function of the container.

The present invention has been described with reference to preferred embodiments. However, it is of course that various embodiments other than those described above are possible without departing the scope of the invention.

The invention claimed is:

1. A synthetic resin container having a craze pattern on a surface of a container body, said container comprising:
    an inner layer that comes into direct contact with content during its storage;
    a patterned layer carrying a craze pattern which has been formed by applying a solvent to the container body after a blow molding thereof; and
    a translucent protective layer covering from outside at least part of the patterned layer carrying the craze pattern,
    wherein the patterned layer is comprised of a cyclic polyolefin resin, and the inner layer is comprised of a polyolefin resin or of a polyester resin.

2. The synthetic resin container according to claim 1, wherein the inner layer is applied with a color, and the patterned layer is transparent or semi-transparent.

* * * * *